United States Patent Office 2,825,631
Patented Mar. 4, 1958

2,825,631
DIMANGANESE DECACARBONYL AND PROCESS FOR PRODUCING THE SAME

Maurice A. Lynch, Jr., Tonawanda, N. Y., assignor to Union Carbide Corporation, a corporation of New York No Drawing. Application June 14, 1952
Serial No. 293,685

4 Claims. (Cl. 23—203)

The present invention relates to dimanganese decacarbonyl, $Mn_2(CO)_{10}$, a new composition, and to a novel process for producing the same.

Although a vast amount of effort has been directed toward the production of metal carbonyls since L. Mond first produced iron pentacarbonyl in 1891, all attempts to produce and isolate a carbonyl of manganese have, heretofore, proven unavailing.

According to the article "The Metal Carbonyls" by W. E. Trout appearing in Journal of Chemical Education, vol. 14, 1937, page 465: "Pauling, from consideration of the quantum theory, predicted the possibility of the existence of $Pd(CO)_4$, $Pt(CO)_4$, $Ru(CO)_5$, $Os(CO)_5$, $Mn(CO)_5$, $V(CO)_6$ as well as $Co(CO)_4CN$ and $Mn(CO)_5CN$. At this time, any attempts to prepare these compounds, as far as the author knows, have remained either unsuccessful or unreported."

It is, therefore, the prime object of the present invention to provide a process for the production of manganese carbonyl, a new composition of matter.

Other aims and advantages of the invention will be apparent from the following description and appended claims.

In accordance with the process of the present invention, manganese metal and copper iodide are reacted at a temperature of approximately 400°–500° C. in the presence of an inert gas to form a product of copper and a manganese iodide. This product is then reacted in a suitable pressure vessel with magnesium metal and carbon monoxide at a pressure above about 1000 p. s. i. in the presence of ethyl ether, or other suitable neutral oxygenated organic solvent, at a temperature of approximately 25°–100° C. to yield a product. This product may thereupon be treated with cold dilute sulphuric acid if an excess of magnesium has been used. Steam distillation of the as-formed solution separates dimanganese decacarbonyl from the contaminant. Purification of this product is then obtained by sublimation.

The reactions occurring in the process when copper iodide is used may be represented as follows:

$$Mn + 2CuI \rightarrow MnI_2 + 2Cu$$
$$2MnI_2 + 2Mg + 10CO \rightarrow Mn_2(CO)_{10} + 2MgI_2$$

In the distillation step the separation is accomplished by first driving off the ether and then the dimanganese decacarbonyl, thereby leaving the contaminant which consists largely of magnesium iodide and some unreacted manganese iodide, magnesium and copper.

The manganese carbonyl so obtained has been found to exist as dimanganese decacarbonyl, i. e., $Mn_2(CO)_{10}$. This compound is a volatile, golden-yellow solid having the properties listed in Table I.

TABLE I

| | |
|---|---|
| Formula | $Mn_2(CO)_{10}$. |
| Molecular weight | 380 (found)—390 (calculated). |
| Chemical analysis | Found: Mn, 26.7%; C, 30.7%. Calculated: 28.2%; 30.8%. |
| Melting point—to an orange liquid (under CO sealed tube pressure) | 150°–151° C. |
| Sintering point (under CO sealed tube pressure) | 140° C. |
| Decomposition point (at atmospheric pressure) | Above 125° C. |
| Stability | Unstable toward light and heat in solid state and in solution in organic solvents. |
| Solubility | Insoluble in water but soluble in common organic solvents. |
| Density (grams/cc.) | 1.75 (found). |

Infrared spectrum analyses of this compound have indicated that its most likely structural arrangement is as follows:

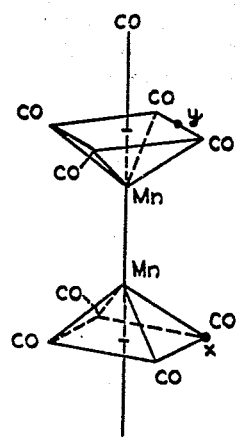

with an orientation between the two planes such that the point $x$ is below point $y$, as generally shown above.

X-ray data indicated that the crystals obtained are monoclinic with crystalline axes as follows: $a_0$—14.68 A.; $b_0$—14.16 A.; $c_0$—7.16 A. and an angle $a$–$c$ equal to 75 degrees.

The calculated density on the assumption of four molecules of $Mn_2CO_{10}$ per unit cell was found to be 1.791 grams/cc.

Two examples of the novel process of the present invention are described below:

Example 1

0.05 M of manganese metal powder was reacted with 0.1 M copper iodide at a temperature of 500° C. To the resultant product 0.1 M of magnesium powder and 0.1 liter of ether were added. This was reacted at room temperature under 3000 p. s. i. carbon monoxide pressure for 17 hours. Thereupon the dimanganese decacarbonyl was separated from the contaminant by steam distillation.

Example 2

0.1 M of powdered manganese metal was reacted with 0.3 M of copper iodide at a temperature of 500° C. To the resultant product 0.1 M of powdered metallic magnesium and 0.1 liter of diethyl ether were added. This was reacted at room temperature under 3000 p. s. i. deoxygenated carbon monoxide pressure for 65 hours. The dimanganese decacarbonyl was separated by steam distillation.

Dimanganese decacarbonyl has been found effective as an antiknock additive to fuels such as gasoline.

What is claimed is:
1. Dimanganese decacarbonyl.
2. A process for preparing dimanganese decacarbonyl in a highly pure form which comprises reacting manganese iodide with metallic magnesium and carbon monoxide under greater than 1000 pounds per square inch pressure at a temperature of approximately 25°–100° C. in the presence of ethyl ether to yield a product containing dimanganese decacarbonyl, and removing said dimanganese decacarbonyl from the other reaction products.
3. A process for preparing dimanganese decacarbonyl in a highly pure form which comprises reacting manganese metal and copper iodide at a temperature of approximately 400°–500° C. to produce manganese iodide and copper, reacting said as-formed manganese iodide and copper with carbon monoxide at a pressure greater than 1000 pounds per square inch and magnesium metal in the presence of ethyl ether at a temperature of approximately 25°–100° C. to yield a product containing dimanganese decacarbonyl, and removing said dimanganese decacarbonyl from the other reaction products.

4. A process for preparing a product containing dimanganese decacarbonyl which comprises reacting manganese iodide with metallic magnesium and carbon monoxide under greater than 1000 pounds per square inch pressure at a temperature of approximately 25°–100° C. in the presence of ethyl ether compound.

References Cited in the file of this patent

UNITED STATES PATENTS 2,375,236　　Miller _____ May 8, 1945

OTHER REFERENCES

Hurd et al.: "Manganese Carbonyl," Jour. of Am. Chem. Soc. 71, 1899 (1949).

Owen et al.: "The Synthesis of Chromium Hexacarbonyl," Jour. of Am. Chem. Soc. 69, 1723–24 (1947).

U. S. DEPARTMENT OF COMMERCE
PATENT OFFICE

CERTIFICATE OF CORRECTION

Patent No. 2,825,631                                March 4, 1958

Maurice A. Lynch, Jr.

It is hereby certified that error appears in the printed specification of the above numbered patent requiring correction and that the said Letters Patent should read as corrected below.

Column 3, line 10, after "ether" strike out -- compound --.

Signed and sealed this 15th day of April 1958.

(SEAL)
Attest:
KARL H. AXLINE
Attesting Officer

ROBERT C. WATSON
Commissioner of Patents

U. S. DEPARTMENT OF COMMERCE
PATENT OFFICE

CERTIFICATE OF CORRECTION

Patent No. 2,825,631      Maurice A. Lynch, Jr.      March 4, 1958

It is hereby certified that error appears in the printed specification of the above numbered patent requiring correction and that the said Letters Patent should read as corrected below.

Column 2, lines 4 through 22, insert a "CO" group to the lower end of the structure.

Signed and sealed this 10th day of June 1958.

(SEAL)

Attest:
KARL H. AXLINE

Attesting Officer

ROBERT C. WATSON
Commissioner of Patents